J. H. Haertter,
Thrashing Mach.
Nº 5,594. Patented May 23, 1848.

UNITED STATES PATENT OFFICE.

JACOB HAERTTER, OF POTTSVILLE, PENNSYLVANIA.

THRESHING-MACHINE.

Specification of Letters Patent No. 5,594, dated May 23, 1848.

*To all whom it may concern:*

Be it known that I, JACOB HAERTTER, of Pottsville, in the county of Schuylkill and State of Pennsylvania, have invented a new and useful Machine for Threshing Grain, which is described as follows, reference being had to the annexed drawings of the same, making part of this specification.

Figure 2:
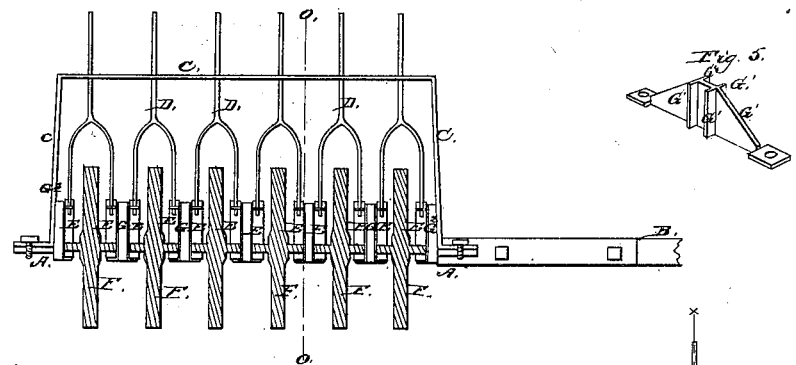
Figures 3, 5:
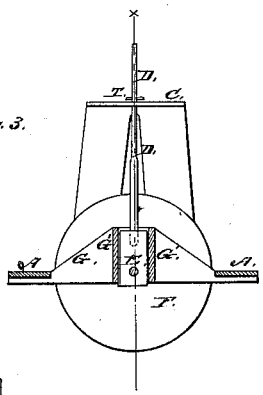
Figure 1:
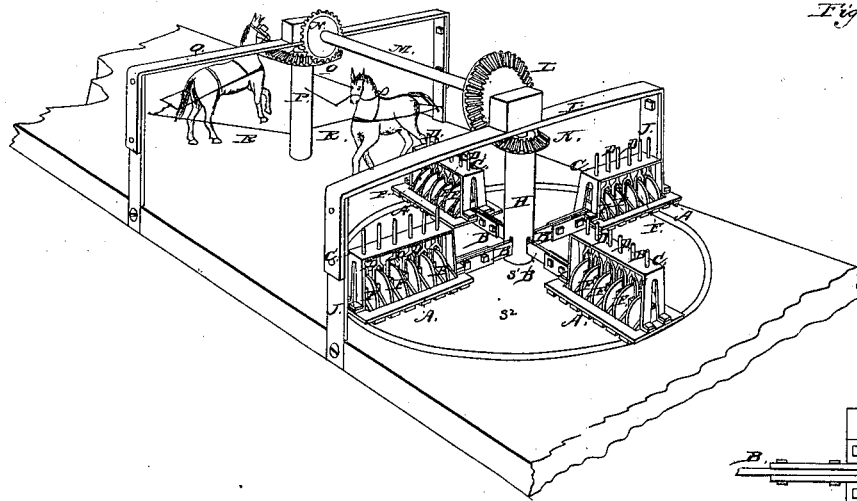
Figure 4:
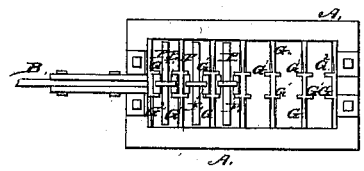

Figure 1, is a perspective view of the machine. Fig. 2, is a vertical longitudinal section of a set of threshing wheels, drawn on the dotted line *x x* of Fig. 3, to an enlarged scale. Fig. 3, is a transverse section on the line *o o* of Fig. 2 showing an elevation of one of the guide plates and wheels. Fig. 4, is a plan of the frame with the perforated guide plate removed showing the ribbed guide plates, blocks, and three of the wheels. Fig. 5, is a perspective view of one of the guide plates placed between the wheels.

Similar letters in the several figures refer to corresponding parts.

This machine differs from all other machines for threshing grain, known or in use. It consists of four horizontal frames of wheels, for beating the grain from the straw, turning on horizontal axles, each wheel moving independently of the others in a concentric circle on its own axle and vertical by the rising and falling of its boxes, on a horizontal platform, inside of a circular curb; within which the bundles of grain to be threshed are placed, after being untied, the frames being secured to the extremities of arms passed through a vertical shaft at right angles and crossed so that when said shaft is turned on its axis which is accomplished by ordinary power gearing propelled by animals—said wheels (which may be 24 in number, more or less) are made to roll around in concentric circles upon the grain, the wheels striking the grain and threshing it from the straw without doing much injury to the latter, which is removed from the platform in a fit state to be cut for horse feed, or other purposes, while the grain is moved toward the center of the platform—the effect produced being something like that effected by a number of horses made to move around on a platform in concentric circles in treading out grain, except that the horses' feet cut and break the straw, and the wheels do not injure it; and the latter separate the grain from the straw more effectually and act over a larger proportion of the surface of the platform within the curb, the wheels being so arranged in the frames as not to turn in the same circles.

Each metallic frame A is made of an oblong form, as represented at A, in Figs. 1 and 2, and more particularly in the plan Fig. 4—having two vertical flanges or jaws at its inner end which embrace the end of the arm B and by which the frame is bolted thereto. Combined with this frame is a horizontal perforated guide plate C for guiding the upper ends of forked shafts rods or stems D attached to the sliding boxes E of the wheels F—said guide plate C being supported above the wheels by four legs whose feet are turned at right angles and bolted to the frame A.

The wheels F for threshing the grain from the straw are made of cast iron or other material of any required diameter and thickness, each having a short axle passing through the center of the same and entering the two sliding boxes, one on each side of wheel, attached to the forked end of the guide shaft or rod D and rising and falling with it as the wheel rises and falls in passing over the inequalities of surface or bundles of straw. These vertically sliding blocks or boxes E are held in their proper places by means of vertical guide plates G placed between the wheels and bolted to the frame A, having parallel ribs G' cast on both sides, between which the blocks E are placed as represented in perspective at G' Fig. 5.

The plan Fig. 4 shows each plate made with four ribs G', except the end plates G², which have each only two ribs, next the wheels. All the frames and their wheels, axles, blocks, forked guide rods and guide plates, are made in a similar manner, but the wheels are placed at unequal distances from the center of the platform. The frames A' are bolted to the arms B passing through the main shaft H, in a similar manner. The drawing represents two pieces of timber B passed through oblong mortises in the upright main shaft H at right angles notches or halved together at the middle to prevent them from having any longitudinal movement in the mortises in the shaft, forming four radial arms B B B B to which the frames are secured. There may, however, be a greater or less number of arms, and frames, and wheels according to the wants of the farmer.

The main or central shaft H is stepped in an oil cup, or ink, in the center of the circle on the platform, and its upper end its sustained in a vertical position by a horizontal cap I turned down at its ends and bolted to two posts J J let into the platform—in which cap I the upper gudgeon of the shaft turns.

The main shaft H may be turned by an ordinary horse power, or any suitable and convenient means; or a combination of cog wheels, shafts, and levers, such as that represented in the drawing, Fig. 1—which is a horizontal bevel wheel K, fixed to the upper end of the main shaft H, into which meshes a vertical bevel wheel L on one end of a horizontal shaft M, carrying a second vertical bevel wheel N on its opposite end, that meshes into a second horizontal bevel wheel O on the upper end of a second vertical shaft P, whose lower gudgeon is stepped into a box on a platform, and its upper gudgeon inserted into a box in a cap Q made and arranged and supported in the manner of the first named cap, having levers, or sweeps R, inserted into said shaft, to which the animals are attached for operating the machine.

Operation: The manner of separating the grain from the straw with this machine, without breaking the grain or straw, is to untie the bundles of grain to be threshed and lay them on the platform, with the heads of grain next the center of the circular platform and the butts, or cut ends, next the circular curb S, and after being spread out evenly upon the platform in radial lines, the horses are driven around in a circle, putting in motion the cogged gearing and threshing wheels, which turn on their own axes in the sliding boxes as they are driven around in circles of different radii at the required degree of velocity, the wheels striking the grain and beating it from the straw, which is kept in a proper position for the action of the wheels thereon by attendants with rakes, who are stationed around the circle, and who, with the backs of the rakes push the grain, as fast as it is threshed from the straw, into the central circle S' of the platform where the wheels do not travel. When the grain is short the wheels nearest the center of the machine may be raised in their frames by inserting pins T Fig. 3 horizontally through the shafts D above the caps $c$ and resting thereon, which will sustain the wheels above the platform $S^2$.

The circular curb S should be sufficiently high to confine the straw within the circle which it circumscribes. The machine may be covered with a light roof; or be placed in a separate building; or in a barn in such position as to enable the farmer to discharge the grain as fast as threshed through openings in the platform near the center provided with spouts leading to a winnowing machine for cleaning the grain. The machine may be made of any suitable size, proportion, material, number of wheels; and be portable, or otherwise. A large proportion of the machine may be composed of cast plates. The wheels may be smooth, or serrated on their peripheries for separating the grain from the straw effectually.

I do not claim to be the original inventor of the mode of threshing grain from straw by means of wheels, or rollers, placed upon radial arms; but What I do claim as my invention and which I desire to secure by Letters Patent is—

The combination and arrangement of the wheels or rollers F—frames A—boxes E,—rods D and arms B operating in the manner and for the purpose substantially as above set forth—each of said wheels having a rotary as well as a vertical motion and all of them turning in concentric circles.

In testimony whereof I have hereunto signed my name before two subscribing witnesses this twentieth day of August, 1847.

JACOB HAERTTER.

Witnesses:
WM. P. ELLIOT,
A. E. H. JOHNSON.